United States Patent [19]

Benda et al.

[11] Patent Number: 5,508,489
[45] Date of Patent: Apr. 16, 1996

[54] APPARATUS FOR MULTIPLE BEAM LASER SINTERING

[75] Inventors: John A. Benda, Amston; Aristotle Parasco, Bolton, both of Conn.

[73] Assignee: United Technologies Corporation, Hartford, Conn.

[21] Appl. No.: 292,125

[22] Filed: Aug. 17, 1994

Related U.S. Application Data

[62] Division of Ser. No. 139,375, Oct. 20, 1993, Pat. No. 5,393,482.

[51] Int. Cl.⁶ .................................................... B23K 26/00
[52] U.S. Cl. ................... 219/121.76; 219/121.77
[58] Field of Search ................... 219/121.76, 121.77, 219/121.83, 121.65, 121.66, 121.61, 121.62, 121.8, 121.81; 264/25; 419/53

[56] References Cited

U.S. PATENT DOCUMENTS

| | | | |
|---|---|---|---|
| 3,892,488 | 7/1975 | Edmonds | 219/121.76 |
| 5,135,695 | 8/1992 | Marcus | 219/121.83 |
| 5,316,720 | 5/1994 | Spiegel et al. | 419/53 |
| 5,352,405 | 10/1994 | Beaman et al. | 219/121.64 |
| 5,382,308 | 1/1995 | Bourell et al. | 156/62.2 |

FOREIGN PATENT DOCUMENTS

| | | |
|---|---|---|
| 2-258693 | 10/1990 | Japan. |
| 2258697 | 10/1990 | Japan. |

*Primary Examiner*—Geoffrey S. Evans
*Attorney, Agent, or Firm*—Gerald L. DePardo

[57] ABSTRACT

A multiple beam laser sintering device includes a sintering beam 64 having a focal point at a powder bed 68 and at least one defocussed laser beam 116 incident on a region near the focal point of the focussed beam 64. The sintering beam 64 raises the temperature of the powder 84 to the sintering temperature. The defocussed beam 116 raises the temperature of the material surrounding the sintering beam 64 to a level below the sintering temperature, thereby reducing the temperature gradient between the sintering location and the surrounding material. Thermal radiation may be measured from one or both beams and used to control the power of one or both beams and the power of one or both beams may be controlled to maintain the temperature at a desired level. Alternatively, a plurality of defocussed beams may be used to provide either a plurality of thermal gradient steps, or to control the temperature of each region around the sintering point independently.

26 Claims, 8 Drawing Sheets

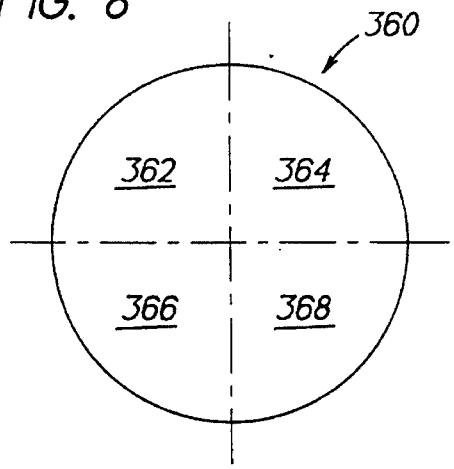
FIG. 8
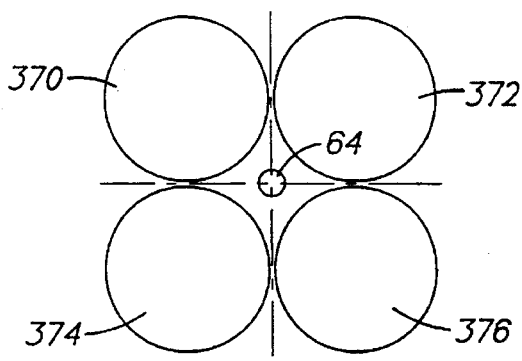
FIG. 9
FIG. 11
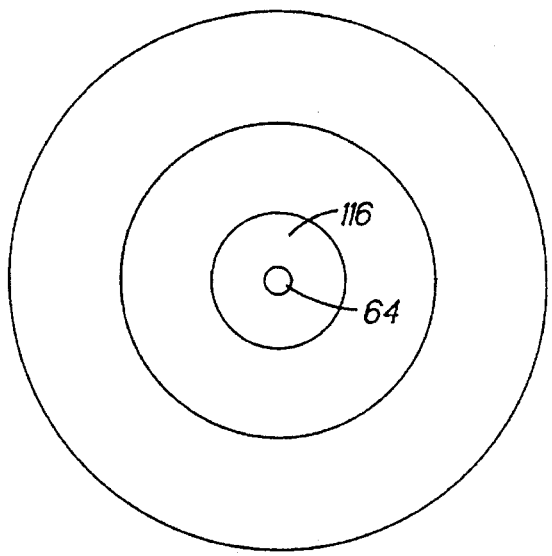
FIG. 10
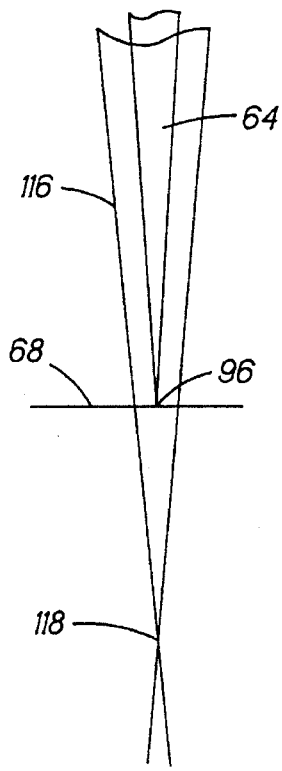

FIG. 12
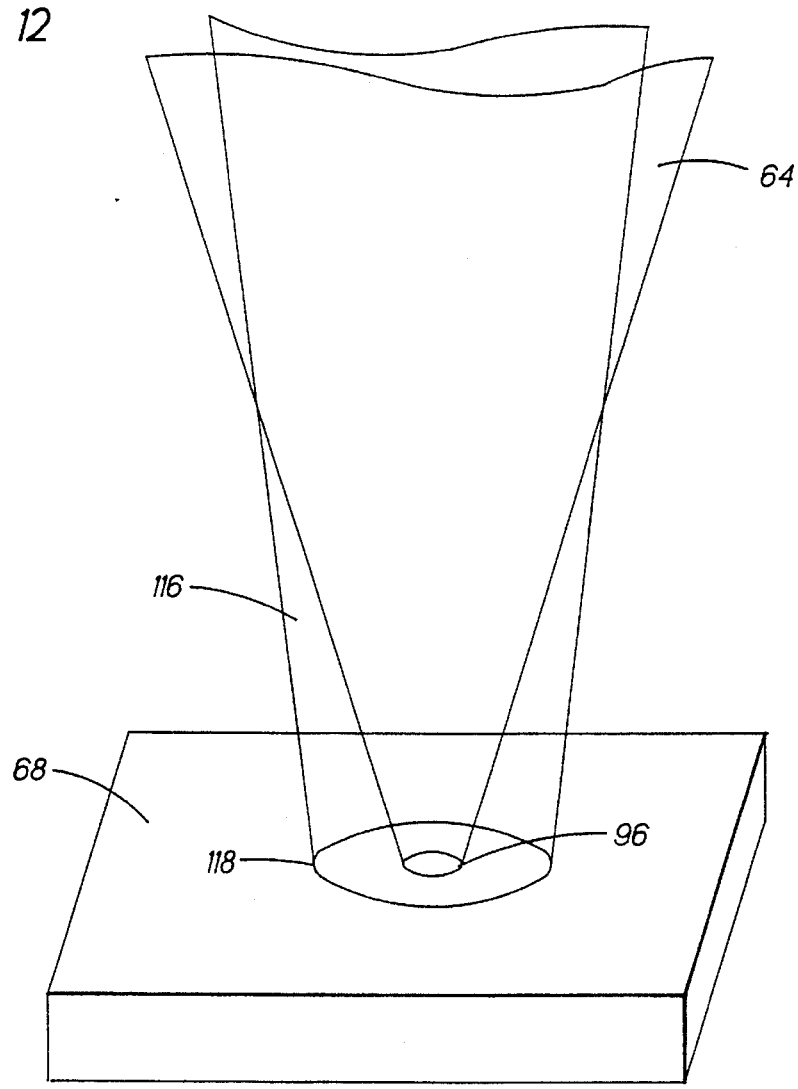
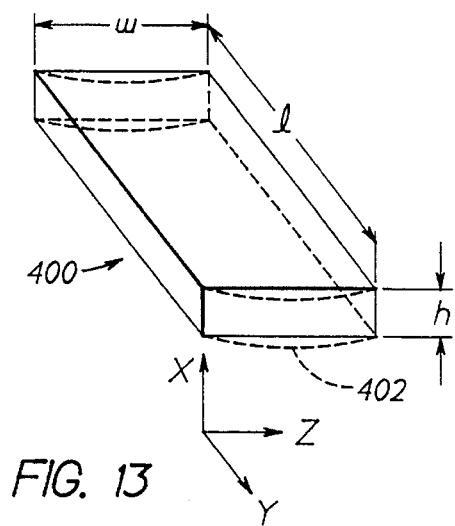
FIG. 13

Prior Art

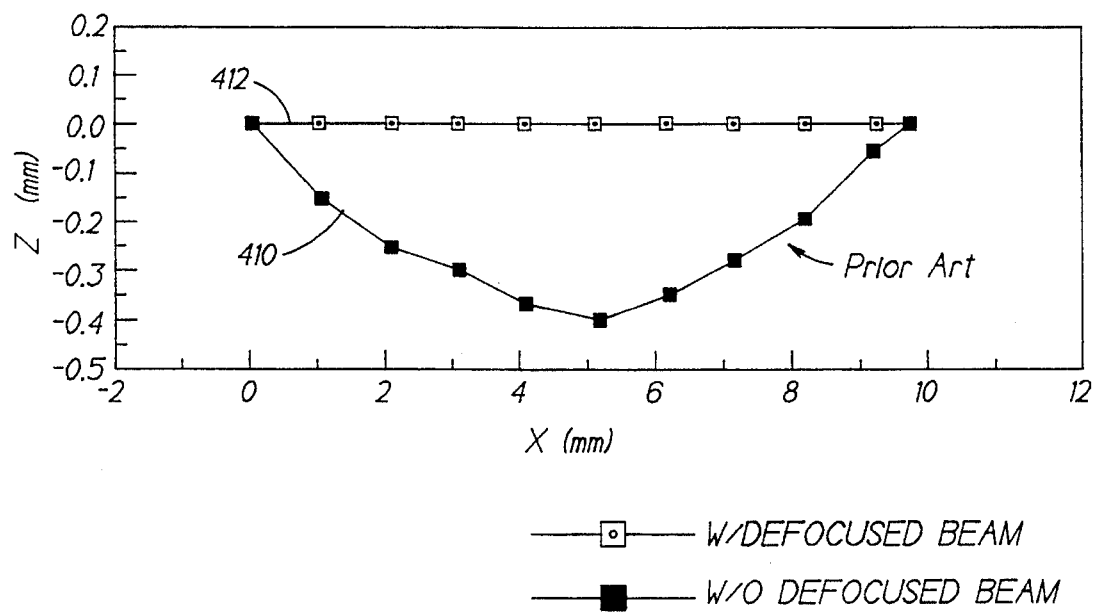

APPARATUS FOR MULTIPLE BEAM LASER SINTERING

This is a division of copending application Ser. No. 08/139,375 filed on Oct. 20, 1993.

CROSS REFERENCES TO RELATED APPLICATIONS

Co-pending U.S. patent application Ser. No. (UTC Docket No. R-3668), entitled "Temperature-Controlled Laser Sintering", filed contemporaneously herewith, contains subject matter related to that disclosed herein.

TECHNICAL FIELD

This invention relates to laser sintering and, more particularly, to dual-beam laser sintering for reducing curl.

BACKGROUND ART

It is known in the art of stereolithography to perform rapid prototyping of product molds or the product itself. The stereolithographic approach, as is known, uses an ultraviolet laser to scan across and selectively polymerize a monomer (i.e., solidify a liquid plastic) to build up a prototype layer-by-layer and line-by-line from a predetermined model of a part. In particular, the laser is focused on a portion of a bath of liquid resin which causes the liquid to polymerize (or solidify) where the focal point of the laser contacts (i.e., is incident on) the liquid. This technique allows a part to be rapidly produced that would otherwise take a long time to make through a molding process.

It is also known to do rapid prototyping using an ultraviolet laser to perform selective laser sintering of a powder. Sintering, as is known, is a process in which the temperature of a powdered material is raised to its softening point by thermal heating With a laser, thereby causing the particles of the powder to fuse together in the heated region. The temperature level needed for sintering depends on the material being sintered; but the higher the temperature is, the quicker it sinters. For example, iron powder melts at 1500° C. but will sinter at 1000° C. if the powder remains at that temperature long enough.

In the sintering process, a laser beam at a substantially constant power level is incident on a powder bed and a lateral layer of the part is fabricated by repeated scanning of the laser beam in successive lines across a layer of powder until the entire layer has been scanned. The laser is turned on at points where the powder is to be sintered, otherwise, the laser is off. When one layer is complete, the surface of the sintering bed is lowered, another layer of powder is spread over the previous, now sintered layer, and the next layer is scanned. This process is repeated until the part is complete.

However, one problem with laser sintering is that sintered layers tend to curl due to a thermal gradient (temperature difference) that exists between the high-intensity, small diameter, focal point of the laser beam at the sintering location and the surrounding material.

One technique employed to obviate this problem is to heat up the entire bed of powder to some temperature less than the sintering temperature, thereby reducing the thermal gradient between the laser beam and the surrounding material. While this technique may work for some polymer powders, when metal or ceramic powders are used, the technique is much less successful because of the higher sintering S and melting temperatures involved. First, it is difficult to maintain a uniform temperature across the powder bed. Secondly, if the powder is raised to approximately half the melting temperature, the powder will sinter on its own in a matter of hours. If the powder bed temperature is lower than half the melting temperature, this may not control the curling problem at all.

Thus, it would be desirable to devise a sintering system that does not require heating of the entire powder bed, yet at the same time reduces the curl of the sintered material.

DISCLOSURE OF INVENTION

Objects of the invention include provision of a sintering system which reduces curl of the sintered material.

According to the present invention an apparatus for laser sintering includes a sintering laser beam incident on a surface of a powder at a sintering location; at least one defocussed laser beam incident on a defocussed region near the sintering location; and the defocussed beam providing a predetermined temperature gradient between the sintering location and the surrounding powder.

Still further according to the invention, the defocussed beam overlaps the sintering beam at the surface of the powder. According further to the invention, the sintering beam propagates within the defocussed beam for a predetermined distance before being incident on the powder.

According still further to the invention, the sintering beam is polarized in a direction orthogonal to the polarization of the defocussed beam. In still further accord to the present invention, the sintering beam and the defocussed beam both originate from the same source beam.

In still further accord to the invention, detection means are provided for detecting the temperature of the powder at a detection point near the defocussed region.. According further to the invention, the detection means comprises means for detecting the temperature of the powder at a plurality of detection points around the sintering location. Still further according to the invention, laser control means are provided, responsive to a detection signal from the detection means, for controlling the power of the defocussed laser beam. Still further accord to the invention, the detection means detects radiated thermal emissions from the powder.

The invention represents a significant improvement over previous sintering techniques by reducing curling of sintered parts. Also, the invention also eliminates the need to heat the entire powder bed to a high temperature to reduce curling. The invention provides two beams—a tightly focused beam which sinters the powder and a more broadly focused beam which heats up the area around the tightly focused sintering beam. Thus, the invention reduces the temperature gradient between the sintering beam and the surrounding material, thereby greatly reducing the curl effect.

Also, the invention provides for detecting the thermal radiation of, and thus the temperature of, both the sintering beam as well as the larger beam, thereby allowing precise temperature control of the power of both beams and the associated temperature gradients. Furthermore, by using two beams with different polarizations or two different laser sources, the invention avoids the problem of coherent interference between the beams and the wide variation of the resultant intensity associated therewith. Still further, the invention reduces the tendency for the powder to "ball-up" (or "agglomerate") as it is sintered.

The foregoing and other objects, features and advantages of the present invention will become more apparent in light

BRIEF DESCRIPTION OF THE DRAWINGS

FIG. 8 is a cross-sectional diagram of an image at an optical detector used for sensing temperature at a sintering bed, in accordance with the present invention.

FIG. 9 is a cross-sectional diagram of a sintering beam and a plurality of defocussed beams incident on a sintering bed, in accordance with the present invention.

FIG. 10 is a cross-sectional diagram of a sintering beam and a plurality of concentric defocussed beams incident on a sintering bed, in accordance with the present invention.

FIG. 11 is a diagram of a sintering beam and a defocussed beam having a focal point below the surface of the sintering bed, in accordance with the present invention.

FIG. 12 is a diagram of a sintering beam and a defocussed beam having a focal point at the surface of the sintering bed, in accordance with the present invention.

FIG. 13 is a perspective view of a rectangular part to be sintered, in accordance with the present invention.

FIG. 15 is a graph showing the amount of curvature of the upper surface of the part of FIGS. 13,14 for prior art sintering and sintering in accordance with the present invention.

BEST MODE FOR CARRYING OUT THE INVENTION

Figure 1:
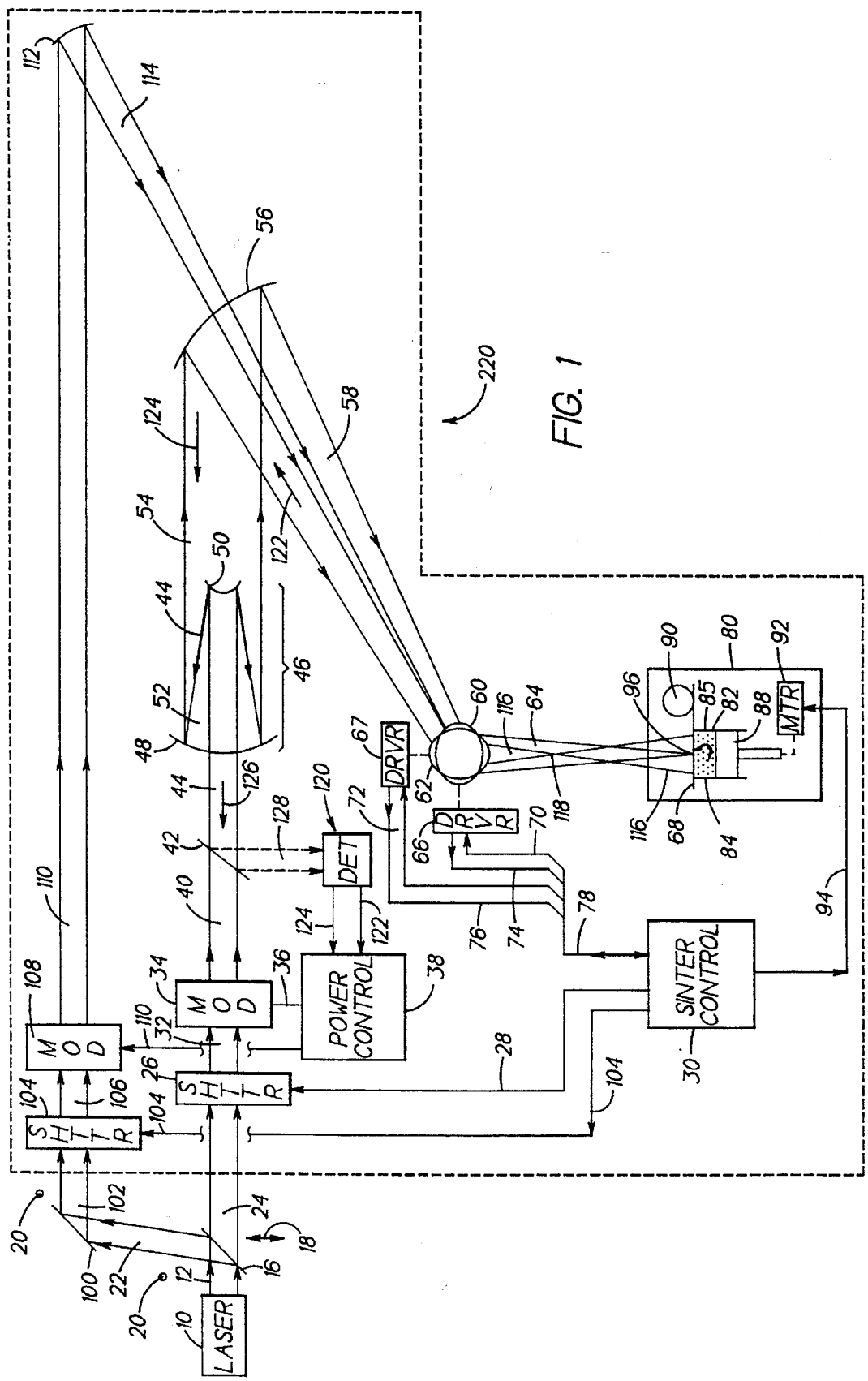
FIG. 1 is a schematic block diagram of a two-beam laser sintering system in accordance with the present invention.

Referring to FIG. 1, a laser 10 provides a collimated output beam 12 with both vertical and horizontal polarized components. The collimated beam 12 is incident on a polarization beamsplitter which passes light polarized along a horizontal axis as indicated by the arrows 18, and reflects light polarized along an axis perpendicular to the axis 18 (i.e., out of the page), as indicated by a dot 20. Consequently, the beamsplitter 16 reflects a light 22 having a polarization along the axis 20 and passes a light 24 having a polarization along the axis 18.

The passed light 24 is incident on a shutter 26 which is controlled by a signal on a line 28 from a sinter control circuit 30 (discussed hereinafter). The shutter 26 has two states, open and closed, and passes light without attenuation when in the open state and blocks all light when in the closed state. The signal on the line 28 from the sinter control circuit is the open/close signal.

The shutter provides an output light 32 to an optical modulator 34. The modulator 34 modulates the power of the light polarized along the axis 18 in response to a signal on a line 36 from a power control circuit 38 (discussed hereinafter) and provides a modulated light beam 40. The light 40 is incident on a dichroic beamsplitter 42 which passes (or transmits) light 44 at the laser wavelength.

The light 44 is incident a ten-to-one (10:1) beam expander 46. The beam expander 46 comprises a pair of curved mirrors 48,50. The beam 44 passes through the mirror 48 to the mirror 50 which provides a divergent beam 52 to the mirror 48. The mirror 48 converts the divergent beam 46 to a collimated beam 54 which is reflected off a focussing optic (curved mirror) 56. The mirror 56 provides a focussed beam 58 to scanning mirrors 60,62. The mirrors 60,62 reflect the focused laser light 58 and provide a directionally controlled focused (or a sintering) beam 64 which is focused onto a sintering powder bed 68 and which sinters the powder.

As is known, the scanning mirrors 60,62 direct the sintering beam 64 to scan across lines on the powder bed 68 to selectively sinter desired locations. The scanning mirrors 60,62 are driven by Galvanometric drivers 66,67, respectively, e.g., Model G325DT by General Scanning Inc, in response to drive signals on lines 70,72, respectively, from the sinter control circuit 30. The drivers 66,67 also provide position feedback signals on lines 74,76, respectively, to the sinter control circuit 30. The lines 70,72,74,76 are indicated collectively as a line 78 connected to the sinter control circuit 30.

Also, as is known, the sintering process occurs in a chamber 80 having a predetermined gas or vacuum therein. Within the chamber 80 is a container 82 which houses powder 84 to be sintered at predefined locations to create a predetermined shaped part 85. The container 82 has a movable bottom portion comprising a piston 88 which sets the depth of the container 82. When a layer of powder has been sintered, the piston 88 is lowered and a roller 90 rolls more of the powder 84 across the powder bed 68 for sintering. The piston 88 is controlled by a motor 92 which is controlled by an electrical signal on a line 94 from the sinter control circuit 30.

The sintering beam 64 is incident on the powder bed 68 at a point 96. The heat from the laser beam causes the powder particles 84 to fuse (or sinter) because the temperature is raised by the energy from the sintering beam 64 (as discussed hereinbefore).

The sinter control circuit 30 provides the output signal on the line 28 to drive the shutter 26, on the line 94 to drive the motor 92 which drives the piston 88, and on the lines 70,72 to drive the scanning mirrors 60,62, respectively. The sinter control circuit 30 positions the sintering beam 64 on the powder bed 68 and controls the scanning of the sintering beam 64 across the powder bed 68. Additionally, the sinter control circuit 30 opens and closes the shutter 26 at the appropriate times to sinter predetermined sections of a scan to produce a given part.

The sinter control circuit 30 may likely be a digital computer having a layer-by-layer, scan-by-scan layout of the part to be produced, and determines when the laser beam should be turned on or off by the shutter 26. Many different techniques may be used for the sinter control circuit 30 and the type of control circuit used does not effect the present invention. The sinter control circuit 30 is well known in the art, as discussed in copending U.S. Patent Application, Serial No. (UTC Docket No. R-3668), entitled "Temperature-Controlled Laser Sintering", filed contemporaneously herewith.

The reflected collimated light 22 from the polarization beamsplitter 16 which is polarized solely along the axis 20, is incident on a turning mirror (or flat) 100. The mirror 100 provides a reflected beam 102 to a shutter 104, similar to the shutter 26 discussed hereinbefore, which passes or blocks the input light 102 in response to a signal on a line 104 from the sinter control circuit 30. The shutter 104 provides an output light 106 to an optical modulator 108, similar to the modulator 34 discussed hereinbefore, which modulates the power of the input light 106 in response to a signal on a line 110 from the power control circuit 38 (discussed hereinafter).

The modulator 108 provides an output beam 110 to a focussing mirror 112 which provides a focused beam 114 which passes through a hole in the mirror 56 to the scanning mirrors 60,62 which provide a defocussed beam 116. The-beam 116 has a focal point 118 above the sintering bed 68 and thus has a diameter at the bed 68 which is wider than the diameter of the sintering beam 64.

We have found that using the second defocused beam 116, the temperature gradient between the sintering beam 64 and the surrounding material is decreased, thereby reducing the curling effect. Also, we have found that it also reduces the tendency for the fused material to "ball-up" or "agglomerate" as the powder is being sintered.

We have also found that, for best performance, the defocussed beam 116 should be turned on before the tightly sintering beam 64 to provide some initial heating in the area before the high intensity sintering beam 64 strikes the surface. However, they may be turned off at the same time. Thus, the sinter control circuit 30, which controls the two shutters 26,104, should be designed to provide for this difference in turn-on time.

The power control circuit 38 controls the modulators 34,108 to adjust the power of the sintering beam 64 and the defocussed beam 116, respectively based on emitted thermal radiation detected by an optical detector module 120. In particular, the powder emits thermal infra-red radiation in the region where the beams 64,116 are heating the powder. The radiation is imaged through the scanning mirrors and is incident on the mirror 56 as indicated by the reverse travelling arrow 122. The radiation is reflected off the mirror 56 as in indicated by an arrow 124. The radiation 124 is reduced in size through the 10:1 telescope (going in the opposite direction) and emerges as a smaller beam indicated by the arrow 126. The radiation 126 is incident on the dichroic beamsplitter which reflects light at the wavelengths of the radiation 126 and provides a reflected beam 128 onto the detectormodule 120.

The detector module 120 provides electrical output signals on lines 122,124 to the power control circuit 38. The power control circuit 38 controls the power of the respective beams 64,116 to predetermined reference thresholds, to provide a substantially constant sintering temperature and a substantially constant temperature gradient between the sintering beam 64 and the defocussed beam 116, and between the defocussed beam 116 and the surrounding material. The power control circuit 38 (details not shown) is substantially similar to that described in the aforementioned copending patent application (FIG. 3); however, the circuit for the present invention has two control loops, one for each output beam, instead of one. Other control techniques may be used if desired.

It should be understood that the two beams 64,116 incident on the powder bed 68 have orthogonal polarizations. This is done to prevent coherent interference between the beams which can cause a significant variation (as much as 3:1) in power in the focussed beam due to very small changes (e.g., as little as one-quarter of a wavelength) in the optical path length difference between the two beams 64,116. This occurs because the field amplitudes, not the intensities, of the two beams add.

Figure 2:
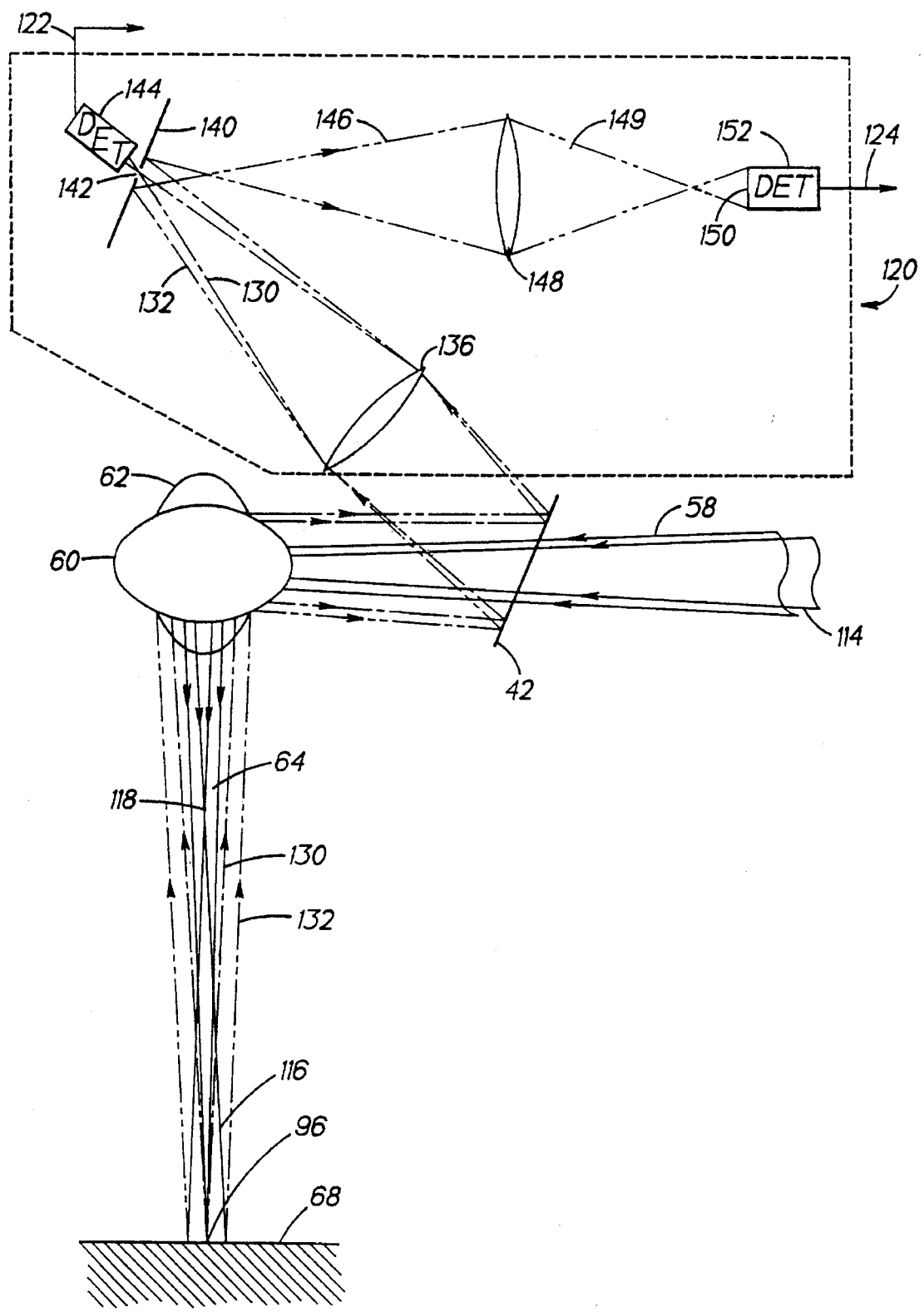
FIG. 2 is a schematic block diagram of a blow-up of optics for providing detection of radiation emission associated with a larger and a smaller beam, and also shows an alternative embodiment for tapping-off radiated emissions, in accordance with the present invention.

Referring now to FIG. 2, a detailed diagram of the detector module 120, shows thermal radiation 130 from the sintering beam 64 and thermal radiation 132 from the defocussed beam 116. The detector module 120 comprises a focussing lens 136 which focusses both the radiation 130 from the sintering beam 64 and the radiation 132 from the defocussed beam 116 onto an aperture 140 with a reflective outer surface. A hole 142 in the aperture 140 allows the radiation at the surface of the powder at the location of the sintering beam 64 to be imaged onto a detector 144. The detector 144 provides an electrical output signal on the line 122 indicative of the power level of the radiation from region of the sintering beam 64.

The thermal emission 132 from the defocussed beam 116 is reflected off the surface of the aperture 140 as the beam 146 which is incident on a focussing lens 148. The lens 148 provides a focussed light 149 which provides an image 150 of the region around the focussed light onto a second detector 152. The detector 150 provides an electrical output signal on the line 124 indicative of the power level of the radiation from region of the defocussed beam 116.

FIG. 2 also shows an alternative embodiment for tapping-off the radiation by placing the dichroic beamsplitter 42 between the scanning mirrors 60,62 and the focussing mirror 56. Instead of using the dichroic beamsplitter 42 to reflect the thermal radiation, a scrapper mirror having a hole in the region where the beams 58,114 would pass, may be used if desired.

Figure 3:
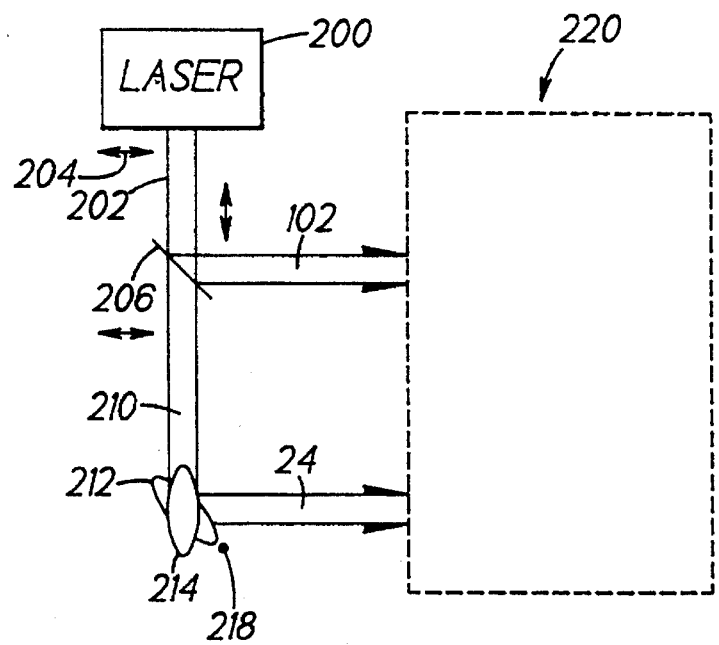
FIG. 3 is schematic of an alternative embodiment of a two-beam laser sintering system having a laser that provides light polarized in only one direction, in accordance with the present invention.

Referring now to FIG. 3, instead of employing a laser that provides an output beam with two polarizations, a laser 200 may be used which provides an output beam 202 polarized in a single direction, as indicated by the arrows 204. The beam 202 is incident on a conventional beamsplitter 206. The beamsplitter 206 reflects a portion of the light 202 as the light 102 and the remaining portion of the light 202 is passed through the beamsplitter 206 as a light 210. The amount of light 208 which is reflected depends on the coatings and substrate of the beamsplitter as is well known in the art.

The light 210 is incident on a pair of mirrors 212,214 and provides the reflected beam 24 having a polarization as indicated by the dot 218 (out of the page) which has been rotated 90 degrees from the polarization of the incident light 210.

The light beams 24,102 are incident on the same other optical components and controllers that are in a dashed box 220 of FIG. 1, discussed hereinbefore.

Figure 4:
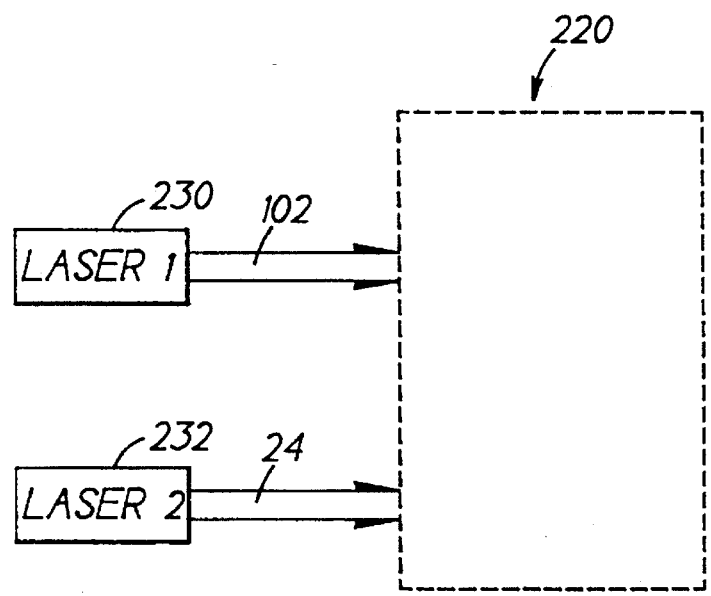
FIG. 4 is schematic of an alternative embodiment of a two-beam laser sintering system having two independent lasers each providing a laser beam, in accordance with the present invention.

Referring now to FIG. 4, an alternative approach to avoiding the problem of coherent interference is simply to use two independent laser sources 230,232. Thus, instead of deriving the beams 24,102 from the single laser source 10 (in FIG. 1) or 200 (in FIG. 3), they are provided by the two independent lasers 230,232 to the components in the box 220 (FIG. 1). Using the two independent (not synchronized) lasers 230,232 prevents the possibility of coherent interference. In that case, there is no need to have orthogonal polarizations, or to polarize the beams 24,102 at all except as might be required by the optical modulators or other optical components.

Figure 5:
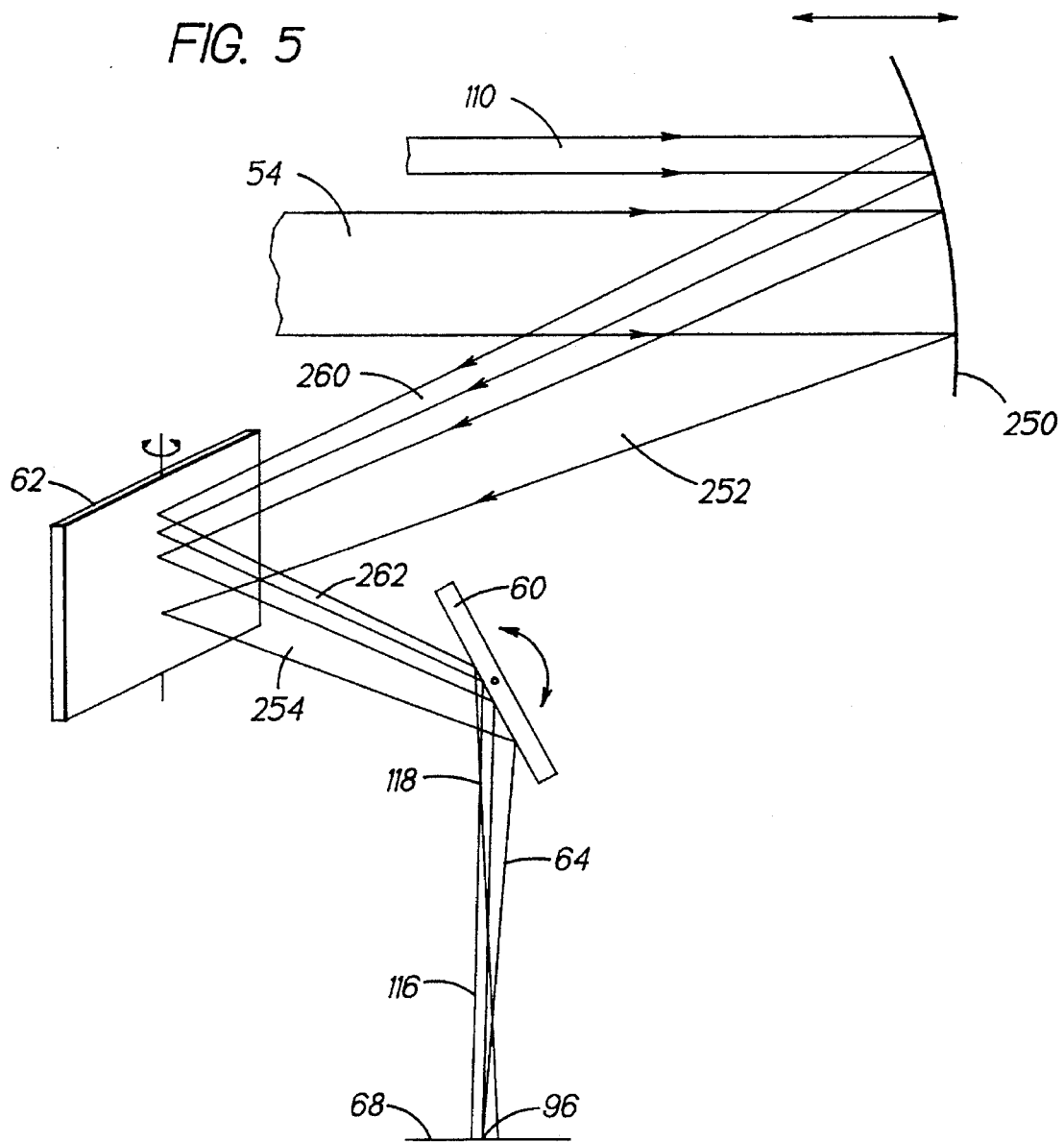
FIG. 5 is a schematic block diagram of an alternative embodiment for providing a second beam, two focussed beams that do not propagate within each other, in accordance with the present invention.

Referring now to FIG. 5, instead of having the focussing optic 56 (FIGS. 1,2) with a hole in it to allow the beam 114 to pass through, a larger focussing optic 250 may be used to reflect and focus both beams 54,110. The beam 54 is reflected off the mirror 250 as a focussed beam 252. The beam 252 reflects off the scanning mirror 62 as a beam 254 and reflects off the other scanning mirror 60 as the sintering beam 64 which is incident on the powder bed 68 at the focal point 96.

The beam 110 is incident on the mirror 250 in a different portion of the mirror from where the beam 54 strikes the mirror 250. The beam 110 reflects off the mirror 250 as a focussed beam 260. The beam 260 reflects off the scanning mirror 62 as a beam 262 and reflects off the other scanning mirror 60 as the defocussed beam 116 with its focal point 118 located to the left of the sintering beam 64. However, the defocussed beam 116 is still concentric with the sintering beam 64 at the powder bed 68.

FIG. 5 also provides a close-up view of how the scanning mirrors 60,62 operate to direct the beams onto and across the powder bed 68.

Where the defocussed beam is incident at an angle to the focussed beam, such as in FIG. 5, as the scanning mirror 60 or 62 rotates, the two beams 64,116 will no longer be concentric since the powder bed is no longer at focus. For small scanning angles this is not much of an effect. However, for large angles, the effect may be dramatic. To avoid such effect, the mirror 250 may be moved to the left, coincident with the rotation of the scanning mirror 60, thereby keeping the distance along the path of the beams between the mirror 250 and the powder bed 68 substantially constant.

Figures 6, 7:
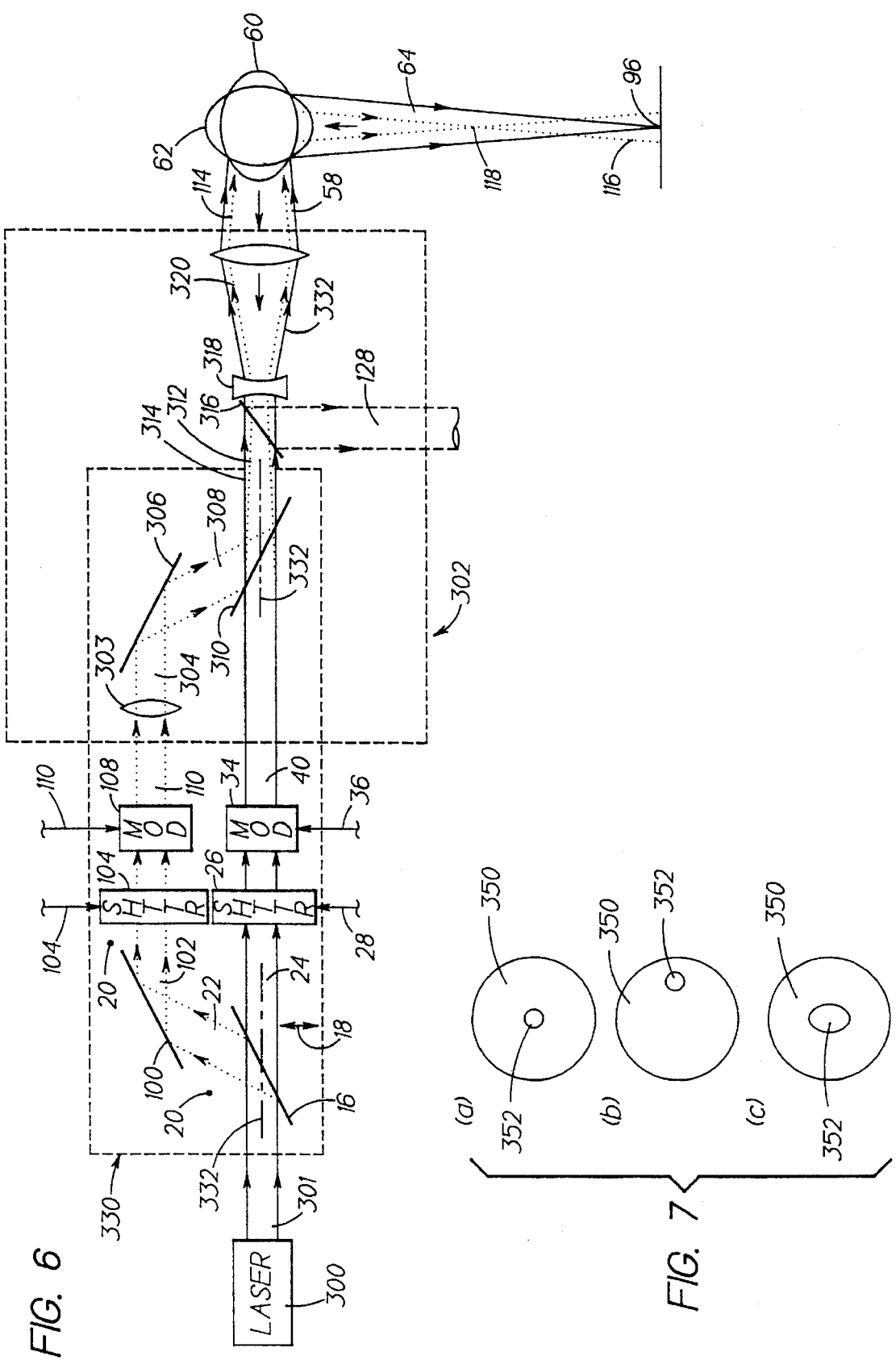
FIG. 6 is a schematic block diagram of an alternative embodiment for providing a two beam sintering system, in accordance with the present invention.
FIG. 7 is a cross-sectional blow-up view of two beams at the surface of a sintering powder comprising: illustration (a) having a smaller beam concentric with a larger beam; illustration (b) showing the smaller beam being not concentric with; and illustration (c) having a smaller beam with an elliptical shape near the center of a larger beam, in accordance with the present invention.

Referring now to FIG. 6, an alternative embodiment for providing a two beam sintering system, has a laser 300 which provides a source beam 301 linear polarization which is neither horizontal nor vertical, e.g., along 45 degrees. The optical parts outside the box 302 are same as those discussed hereinbefore with FIG. 1. The beam 301 is incident on the polarization beamsplitter 16, which provides the beam 22 polarized along the axis 20 and provides the beam 24 polarized along the axis 18, similar to that discussed in FIG. 1. The output beam 110 from the modulator 108 is incident upon a focussing lens 303 which provides a focussed beam 304 to a turning mirror (or flat) 306. The lens 303 serves to shift the focal point of the light polarized along the axis 20, thereby allowing for the defocussed beam 116.

The mirror 306 provides a reflected light 308 to another polarization beamsplitter 310, similar to the beamsplitter 16 and which is oriented in the same direction as the beamsplitter 16. The beam 40 from the modulator is also incident on the beamsplitter 310. The beamsplitter 310 reflects the beam 308 as a beam 312, and it passes the light 40 as a light 314.

The beams 312,314 propagate together to a dichroic beamsplitter 316 which passes light at the laser wavelength. The beams 312,314 are incident on a beam expander 318 which converts the convergent beams 312,314 to divergent beams 320,322, respectively, thereby expanding the beams. The divergent beams 320,322 are incident on a focussing optic 324 which provides the focussed beams 114,58, respectively (of FIG. 1). The beams 114,58 are incident on the scanning mirrors 60,62 which provide the sintering beam 64 and the defocused beam 116, as discussed hereinbefore.

To change the power ratio between the two beams 64,116 when using the configuration of FIG. 6, the optical components within the box 330 may be rotated about a common optical axis 332 of the incoming beam 301 and the outgoing beams 312,314. Such a rotation may be manual or automatically controlled by a control system, as discussed hereinbefore with FIG. 1.

Referring now to FIG. 7 illust. (a), a circular focal point 352 of the sintering beam 64 (FIG. 1) has a diameter of approximately 0.012 inches and provides the sintering. Also, a circular cross-section 350 of the defocussed beam 116 (FIG. 1) has a diameter of about 0.12 inches (i.e., about a 10:1 ratio from the focussed beam) and provides heating in the area around the sintered area, thereby reducing thermal gradients between the focussed beam and the surrounding material. For a 10:1 beam diameter ratio the power ratio of the focussed beam 64 to the defocussed beam 116 should also be set at about 10:1. However, other focal point and cross-section diameters may be used, and other beam power ratios fixed or variable may be used, if desired.

Factors to consider when designing the beam diameters and power ratios are illustrated in the following example. If the power of the focussed beam is 10 watts and the cross-sectional area of the beam is 1 square millimeter, the intensity of the focussed beam is 10 watts/mm$^2$. Also, if the power of the defocussed beam is 100 watts and the cross-sectional area of the beam is 10 millimeters, the intensity of the defocussed beam is 1 watt/mm$^2$, one tenth of the focussed beam. However, because the defocussed beam is ten times larger than the focussed beam, a given spot of powder on the sintering bed will see the intensity of the defocussed beam for about ten times longer time as the beams are scanned across the spot. Thus, for this example, the amount of heating from the defocussed beam will be approximately the same as the focussed beam.

Referring now to FIG. 7 illust. (b), the cross-section 352 of the sintering beam 64 may be off-centered from the cross-section 210 of the defocussed beam 116 at the powder bed 68 (FIG. 1) so that more or less of the defocussed beam 116 is exposed in the direction of the moving scan or opposite to the direction of the moving scan to provide extra leading heating or trailing heating, if desired.

Referring now to FIG. 7 illust. (c), the cross-section 352 of the sintering beam 64 may instead have an elliptical shape inside the cross section 350 of the defocussed beam 116 due to the angle upon which the tightly focused beam is incident on the powder bed 68. Also, the cross section of the defocussed beam 116 may be slightly elliptical in shape as well or in addition to the focused beam.

Referring now to FIGS. 2 and 8, instead of using a single detector 152 to sense the temperature of the powder at the defocussed beam location, a plurality of sensors may be used to detect portions of the image of the radiated emissions. For example, if the circle 360 represents the image 150 on the detector 152 (FIG. 2), the temperature of regions (or quadrants), 362–368 around the focussed beam may be measured by sensing each quadrant with a separate detector. This allows the power control circuit that controls the power of the defocussed beam 116 to adjust the power based on more specific and directional information. For example, the power of the defocussed beam 116 may need to be increased only when three of the four quadrants indicate the temperature is low. This can avoid increasing the temperature of the whole beam due to a very low temperature existing in only one region, which could cause another region to heat up to the sintering point just to maintain a quadrant above a certain temperature threshold. Also, more or less regions around the sintering beam 64 detected and the appropriate number of detectors may be used if desired.

Referring now to FIG. 9, to allow more precise control of the temperature in the regions around the sintering beam 64 discussed in FIG. 8, a plurality of defocussed beams 370–376 may be used to heat the regions surrounding the sintering beam 64 on the sintering bed 68. This allows more direct control of the temperature of each of the regions sensed by the detector(s) 152. It should be understood that if such a configuration is used, and there is only one laser source, the beams should not overlap, to avoid creating interference fringes as discussed hereinbefore. However if overlapping of two or more of the beams is desired, the overlapping beams should either be from independent laser sources or be orthogonally polarized, to avoid creating interference fringes similar to that discussed hereinbefore.

Referring to FIG. 10, instead of using the sintering beam 64 and a single defocussed beam 116, a plurality of concentric (or non-concentric) defocussed beams may be used if desired. Such a configuration provides for a plurality of temperature gradient steps, to provide a more gradual change in temperature between the sintering beam 64 and the material in the powder bed. It should be understood that if such a configuration is used, the overlapping beams should either be from independent laser sources, be polarized differently, or be donut shaped beams which avoid overlap altogether, to avoid creating interference fringes similar to that discussed hereinbefore.

Referring to FIG. 11, the use of donut shaped beams to avoid coherent interference may also be used in the two beam approach of FIGS. 1 and 3, if desired. In that case, the focal point 118 of the defocussed beam 116 is below the sintering bed 68. This avoids the need for two polarizations of the beams, or the need for two lasers.

Referring to FIGS. 1 and 12, it should be understood that the focal point 118 of the defocussed beam 116 may likely be at the sintering bed 68, just as the sintering beam 64 is. This is accomplished by using the 10:1 telescope 46 to increase the diameter of the collimated portion 44 of the sintering beam to ten times the diameter of the collimated portion 110 of the defocussed beam, prior to reaching the focussing optics 56,112, respectively. Such beam expansion allows the sintering beam 64 to have a focal spot diameter d ten times smaller than the focal spot diameter of the defocussed beam 116. Such a result is based on the known relationship $d=2\lambda f/D$; where D is the input beam diameter to the focussing optic, f is the focal length of the focussing optic, d is the focused spot diameter, and $\lambda$ is the wavelength of the light. Thus, while the larger beam 116 is referred to as the "defocussed" beam it may actually be focussed at the same point as the sintering beam 64, and it should be understood that the term defocussed as used herein does not necessarily mean that the large beam 116 is not focussed on the surface of the powder bed 68, it simply is a label used to refer to the larger beam 116.

Figure 14:
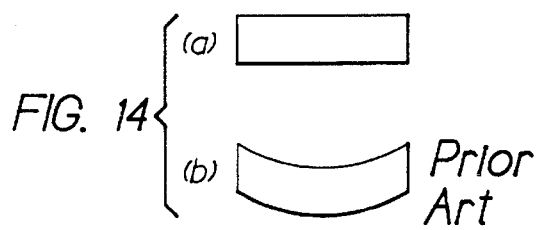
FIG. 14 is an end view of FIG. 13 with: illust. (a) showing the part of FIG. 13 as sintered in accordance with the invention; and illust. (b) showing the part of FIG. 13 with prior art sintering.

Referring now to FIGS. 13,14,15 we have found that using the dual beam sintering approach of the invention greatly reduces the curling which occurs due to the temperature gradients between the sintering beam 64 and the surrounding material. In particular, when sintering a rectangular slab 400 of iron-bronze powder pre-mix having a length 1 of about 1.5 cm, a width w of about 1 cm, and a height h of about 1 mm, using prior art single beam technique, the part will develop a curl along the z-axis direction as indicated by the dashed lines 402. This effect is shown when looking down the Y-axis, in FIG. 14. The part of FIG. 13 sintered using the invention is shown in FIG. 14 illust. (a) and the part sintered using the conventional prior art sintering process is shown in FIG. 14 illust. (b). Using the two beam approach, there was a reduction in curl of about 0.4 mm along the z-axis as compared to the same part sintered using conventional single beam sintering, as shown by the graph of FIG. 15. The slight roughness and imperfections at the surface have been neglected for this illustration.

The rectangular slab 400 (FIG. 13) was created using the two beam sintering process of the invention with about 40 adjacent scans along the length 1 (1.5 cm), and two layers thick. Each layer is typically about 0.01 inches; however, the first layer is typically thicker because it is done on virgin powder. Other scan widths and depths may be used if desired. Also, typically, if many layers are sintered, the upper surface of the part will tend to flatten out due to the way each new powder layer is spread across the part (i.e., filling in the valley created by the curl), thereby leaving a part with a semi-flat top, a curled bottom, and a central region which is thicker than the two ends.

We have also found that multiple beam sintering reduces the tendency of the powder to "ball-up" or "conglomerate" as the powder is sintered.

Instead of using the two modulators 34,108, a single modulator (not shown) may be placed in the path of the beam 12. In that case, the power ratio between the two beams 64,116 will be predetermined by the optical configuration. Also, instead of having the two shutters 26,106, a single shutter (not shown) may be placed in the path of the beam 12, to turn both beams on and off at the same time, if desired.

It should be understood that the invention may be used with any technique for positioning the beam on the surface of the powder. For example, instead of using the variable pitch scanning mirrors 60,62 (FIG. 1), an X-Y plotter-type arrangement may be used to set the coordinates and scan the laser beam. In that case, directional optics are placed on a slidable housing which is mounted to a rail, similar to that discussed in FIGS. 10,11 of the aforementioned copending Patent Application. In that case, the focussing mirrors 56,112 (for the configuration of FIG. 1), or the mirror 250 (for the configuration of Fig.5), or the optics 318,324 (for the configuration of FIG. 6), would be placed on the slidable portion of the device. Also, in that case the detection optics 122 (FIG. 2) may be mounted to the slidable housing, as discussed in the aforementioned copending patent application.

Also, instead of moving mirrors, the sintering platform itself may be moved in one or a plurality of horizontal directions. Further, invention will work equally well without the use of the power control circuit 38.

Furthermore, although the invention has been shown as detecting the thermal radiation through the scanning mirrors by imaging the thermal radiation back through the scanning mirrors to an optical detector, it should be understood that any technique of measuring the temperature of one or both beams at the powder bed 68 is acceptable.

The invention may be used with any type of sintering material, e.g., plastic, wax, metals, ceramics, and others. Also two or more material powder components may be used, e.g., metal-bronze. Further, instead of using convergent beams for the sintering beam 64 and the defocussed beam 116, a collimated beam may be used for either or both of these beams provided that the appropriate power levels and the beam diameters are available.

Even though the modulators 34,108, the shutters 26,104, and the laser source are shown as being separate components it should be understood that some or all of these components may be contained in a single laser package which provides power level control and/or fast on/off beam control for each polarization, e.g., a Duo-Lase 57-2 RF-excited $CO_2$ gas laser made by Synrad. For the case of two independent lasers 230,232 (FIG. 4) the shutters and/or modulators may be incorporated into the respective lasers 230,232.

Also, it should be understood that the power of both beams may be modulated at the same time by a single modulator or by two modulators controlled by the same drive signal. In that case, however, the power ratio between the two beams 64,116, is fixed. Also, the modulator(s) and/or shutter(s) may be placed anywhere in the system provided the beams are modulated and switched to provide the desired sintering.

Further, instead of detecting the temperature exactly at the point where a given beam is incident on the powder bed 68, the detector may detect the temperature at points either in front of, behind, or to the side of the focal point of a beam to help predict or otherwise determine the appropriate power for the laser beam to provide the desired sintering or temperature gradient compensation. Also, the temperature due to the heating on only one of the two beams 64,116 may be detected if desired.

Also, in FIG. 1, the focussing mirrors 56,112 may instead be turning flats and focussing lenses (not shown) may be placed in the path of the beams 54,110, respectively, to provide the convergent beams 64,116. Further, in FIG. 5, the focussing mirror 250 may instead be a focussing lens (not shown) which provides the focussed beams 252,260 onto the scanning mirrors 60,62. In that case, the light would pass straight through the lens (without changing directions as in FIG. 5) and the scanning mirrors 60,62 would be to the right of the mirror 250.

Further, although the invention has been described as detecting temperature based on the detection of thermal radiation, it should be understood that instead of or in addition to detecting thermal radiation other parameters may be detected that relate to temperature, e.g., a plasma (laser-excited atomic states of the cover gas that radiate emissions during energy decay) or a plume (vaporized or particulate material emitted from powder surface that glows due to heat or florescence). For example, the sintering beam may be detected using plasma or plume and the defocussed beam detected using thermal emissions.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An apparatus for laser sintering, comprising:

laser beam means for providing a sintering laser beam incident on a surface of a powder at a sintering location and for providing at least one defocussed laser beam incident on a defocussed region near said sintering location; and said defocussed beam providing a predetermined temperature gradient between said sintering location and the powder surrounding said sintering location.

2. The apparatus of claim 1, further comprising detection means for detecting the temperature of said powder at a detection point near said sintering location.

3. The apparatus of claim 2, further comprising laser control means responsive to a detection signal from said detection means for controlling the power of said sintering laser beam.

4. The apparatus of claim 3 wherein said laser control means comprises means for controlling the power of said sintering laser beam so as to maintain said temperature at a substantially constant level.

5. The apparatus of claim 4 wherein said laser beam means comprises:

scanning means for scanning said laser beams across said surface of said powder; and optical means for directing said radiated thermal emissions through said scanning means to said detection means.

6. The apparatus of claim 2 wherein said detection means detects radiated thermal emissions from said powder.

7. The apparatus of claim 6 wherein said laser beam means comprises:

optical means for directing said radiated thermal emissions to said detection means.

8. The apparatus of claim 2 wherein said laser control means comprises signal processing means responsive to said detection means for providing a power control signal indicative of the desired power of said sintering beam.

9. The apparatus of claim 8 wherein said laser control means comprises modulator means, responsive to said power control signal, for controlling the power of said sintering beam.

10. The apparatus of claims 2 wherein said laser control means comprises signal processing means responsive to said detection means for providing a power control signal indicative of the desired power of said defocussed beam.

11. The apparatus of claim 10 wherein said laser control means comprises modulator means, responsive to said power control signal, for controlling the power of said defocussed beam.

12. The apparatus of claim 1, further comprising detection means for detecting the temperature of said powder at a detection point near said defocussed region.

13. The apparatus of claim 12, wherein said detection means comprises means for detecting the temperature of said powder at a plurality of detection points around said sintering location.

14. The apparatus of claim 13, further comprising laser control means responsive to a detection signal from said detection means for controlling the power of said defocussed laser beam.

15. The apparatus of claim 1, wherein said defocussed beam overlaps said sintering beam at the surface of said powder.

16. The apparatus of claim 1, wherein said defocussed beam does not overlap said sintering beam at the surface of said powder.

17. The apparatus of claim 1, wherein said sintering beam propagates within said defocussed beam for a predetermined distance before being incident on said powder.

18. The apparatus of claim 1, wherein said sintering beam propagates outside of said defocussed beam for a predetermined distance before being incident on said powder.

19. The apparatus of claim 1, wherein said sintering beam is polarized in a direction orthogonal to the polarization of said defocussed beam.

20. The apparatus of claim 1, wherein said sintering beam and said defocussed beam are both unpolarized.

21. The apparatus of claim 1, wherein said sintering beam and said defocussed beam both originate from a single source beam.

22. The apparatus of claim 1, wherein said defocussed laser beam is a convergent beam.

23. The apparatus of claim 1, wherein said sintering laser beam is a convergent beam.

24. The apparatus of claim 1 wherein said powder comprises iron powder.

25. The apparatus of claim 1 further comprising a plurality of said defocussed beams.

26. The apparatus of claim 25 wherein the power level of each of said defocussed beams is controlled individually.

* * * * *